United States Patent
Veres et al.

(10) Patent No.: US 8,284,044 B2
(45) Date of Patent: Oct. 9, 2012

(54) POLL-BASED ALARM HANDLING SYSTEM AND METHOD

(75) Inventors: András Veres, Budapest (HU); Szabolcs Malomsoky, Szentendre (HU); Gergely Szabó, Budapest (HU); Tamas Borsos, Budapest (HU); Péter Benkö, Budapest (HU); Peter Vaderna, Budapest (HU); Ferenc Kubinszky, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 831 days.

(21) Appl. No.: 12/343,094

(22) Filed: Dec. 23, 2008

(65) Prior Publication Data

US 2010/0156622 A1   Jun. 24, 2010

(51) Int. Cl.
*G08B 29/00* (2006.01)

(52) U.S. Cl. ........ 340/506; 340/505; 340/507; 340/511; 340/3.1; 340/6.1

(58) Field of Classification Search .................. 340/505, 340/506, 507, 511, 517, 521, 3.1, 6.1
See application file for complete search history.

(56) References Cited

U.S. PATENT DOCUMENTS

| | | | |
|---|---|---|---|
| 5,400,246 A * | 3/1995 | Wilson et al. .................. 700/17 |
| 5,949,759 A | 9/1999 | Cretegny et al. |
| 6,000,046 A | 12/1999 | Passmore |
| 6,665,262 B1 | 12/2003 | Lindskog et al. |
| 2004/0223461 A1 | 11/2004 | Scrandis et al. |

FOREIGN PATENT DOCUMENTS

| | | |
|---|---|---|
| EP | 0 549 937 A1 | 7/1993 |
| GB | 2318479 A | 10/1996 |
| WO | WO 00/25527 A2 | 5/2000 |

* cited by examiner

*Primary Examiner* — Daryl Pope

(57) ABSTRACT

A system and method of handling poll-based alarms. The method begins by detecting a high-priority problem in a network. Next, network elements in the network related to the high-priority problem are mapped. The mapping step includes grouping network elements into focus groups wherein each focus group includes network elements having the same alarm. The mapped network elements are then polled for alarms. The polled alarms of the network elements are then correlated and processed.

31 Claims, 6 Drawing Sheets

POLL-BASED ALARM HANDLING SYSTEM AND METHOD

BACKGROUND

The present invention relates to communications networks. More particularly, and not by way of limitation, the present invention is directed to a system and method providing poll-based alarm handling in a communications network.

The management and control of the performance within a communications network are becoming increasingly complex. There are various factors which are attributed to this complexity, such as the increased complexity and diversity of the technologies implemented in a network, the spread of highly advanced services with distinct requirements and heightened expectations of the users being served.

Within these complex networks, a single network fault may generate a large number of alarms over space and time. In large, complex networks, simultaneous network faults may occur, causing the network operator to be flooded with a high volume of alarms. The high volume of alarms greatly inhibits the ability to identify and locate the responsible network faults.

In order to mitigate the high volume of alarms, existing fault management systems correlates events into alarms. These existing systems reduce the amount of alarms by attaching the events to an existing alarm if they belong to the same flow or have the same key. In these systems, all alarms reach the Network Elements (NEs) since the network alarms are all correlated at these lower levels. An example of an existing system often referred as "sympathetic alarms" is disclosed in U.S. Patent Application Publication Number 2004/0223461 to Scrandis et al. International Publication Number WO 00/25527 to Tse et al. also discloses an alarm aggregation method.

In addition, there are various existing systems which provide even more advanced event correlation processes, but require the collection of all events and alarms for the correlation process to run. GB 2318479A1 to Niall discloses a knowledge based alarm correlation system. European Patent Publication Number EP 0 549 937 A1 to Bouloutas discloses correlating alarms even if they may hold unreliable or missing information.

Several existing fault management systems also distribute management tasks closer to the network elements in order to reduce the amount of alarm messages. Event correlation on the distributed nodes can be done for locally emitted alarms and only a subset of events is needed to be propagated upwards to the central management system. This method is effective to suppress alarms that are taken from the point of view of the distributed management node. However, these fault management systems are not effective in suppressing alarms if the connection of alarms requires a network view that spans several nodes or domains. U.S. Pat. No. 6,665,262 to Lindskog et al. discloses a management system which collects alarms on a domain level and also performs solutions on the domain level. Any inter-domain problems are propagated upwards in such a system. U.S. Pat. No. 6,000,046 to Passmore discloses a multi-layer system that also correlates events on multiple layers from a bottom-level upward and only propagates alarms that cannot be correlated within the domain.

U.S. Pat. No. 5,949,759 to Cretegny (Cretegny) discloses the suppression of logical alarms and stores these alarms in the network elements. Only physical alarms are sent to the access nodes with topology and correlation information. The access nodes then send the physical alarm to the management system which accesses the logical alarms on-demand using a correlation key.

As discussed above, in a fault situation, the amount of alarms may be very large and difficult to process. Many solutions filter and correlate alarms on the network level which disadvantageously requires sending a large amount of alarms to the central node. This may be similar in effect to a network storm attack and could cause adverse effects on the network. In some existing solutions, the number of alarms is limited by placing the correlation logic closer to the network elements, but such devices are limited because they cannot correlate events when the problem spans several distributed domains. In such cases, the alarms have to be sent to the central node. In modern telecommunication networks, the evaluation of the severity of an alarm is typically hard to conduct below the network layer.

U.S. Pat. No. 5,949,759 to Cretegny highlights the problem of sending too many alarms. Cretegny discloses first discovering correlation keys and then suppressing the transmission of logical alarms. While this solution is effective in suppressing related alarms, it is still based on a bottom-up approach, because a low-level physical alarm needs to trigger the alarm correlation process. Furthermore, low-level physical alarms are not equal from the service or business perspective. For example, on the network element level, an alarm cannot be easily categorized unless it is severe.

All of the existing fault management systems perform a bottom-up approach where alarms are propagated and aggregated from the network elements toward the central management node. The common limitation of this bottom-up approach is that the high-priority problems, such as non-functioning service which typically appears on the network level and lower layer alarms may not hold sufficient information in order to tell whether an alarm is actually important. It is only on the network level where such correlation is possible.

SUMMARY

The present invention is a Poll-Based Alarm (PBA) handling method and system using a top-down approach that focuses on assisting in finding top-level high-priority problems first instead of the conventional alarm correlation methods that correlate alarms from the bottom-up approach. In the present invention, alarms are not propagated up by the PBA method, but are requested on demand only when there is a high-severity situation and when they are needed in order to find the reason for the problem.

In one aspect, the present invention is directed at a method of handling poll-based alarms. The method begins by detecting a high-priority problem in a network. Next, network elements in the network related to the high-priority problem are mapped. The mapping step includes grouping network elements into focus groups wherein each focus group includes network elements having the same alarm. The mapped network elements are then polled for alarms. The polled alarms of the network elements are then correlated and processed.

In another aspect, the present invention is directed at a system for handling poll-based alarms. The system detects a high-priority problem in a network. In addition, the system maps network elements in the network related to the high-priority problem. Furthermore, the system includes a polling functionality for polling the mapped plurality of network elements for alarms. The system correlates and processes the polled alarms.

In still another aspect, the present invention is a node for handling poll-based alarms. In response to a detection of a high-level problem in a network, the node maps a plurality of network elements in the network related to the high-priority problem. The node includes a polling functionality for polling the mapped plurality of network elements for alarms. The polled alarms are then correlated and processed.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
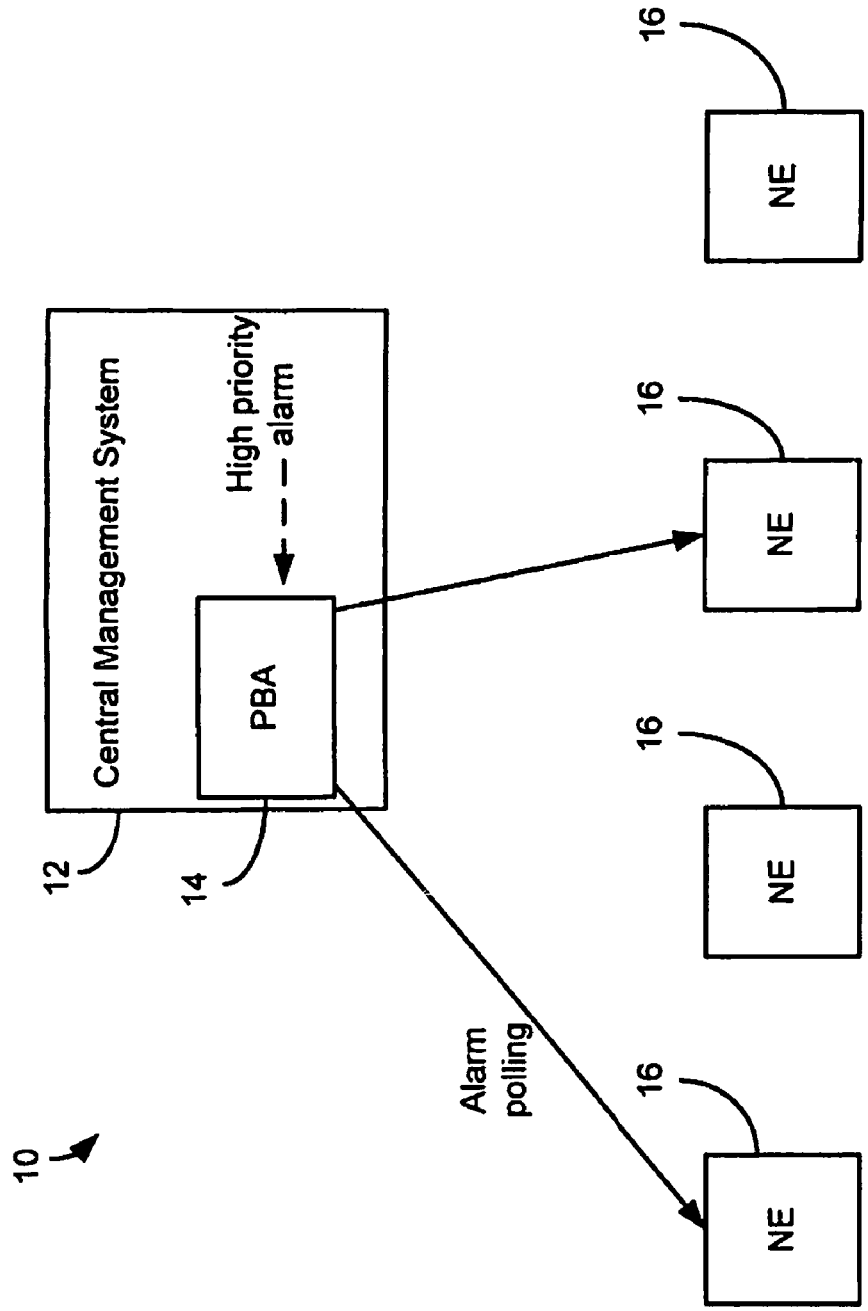
FIG. 1 is a simplified block diagram of a fault management system in the preferred embodiment of the present invention.

The present invention is a Poll-Based Alarm (PBA) handling method and system using a top-down approach that focuses on assisting in finding top-level high-priority problems first rather than the conventional alarm approach that correlate alarms from the bottom-up approach. FIG. 1 is a simplified block diagram of a fault management system 10 in the preferred embodiment of the present invention. The fault management system includes a central management system 12 having a PBA functionality 14. The central management system communicates with a plurality of Network Elements (NEs) 16 via alarm polling.

The PBA functionality 14 is initiated if a top-level performance metric falls below a specified threshold or if a lower-level but high-priority problem persists and has not been taken care of within a specified time period. In a preferred embodiment of the present invention, the top-level metrics may reflect the business priorities of the network and service provider (e.g., the availability, retainability, and accessibility of value added services). The received polling alarms are collected by defining a focus area and a set of poll filters for each network element within a focus area. The selection of a focus area and poll filters are defined in a mapping model. Thus, the PBA functionality 14 greatly reduces the amount of alarms propagated in the network. Matching alarms are polled and correlated with existing methods (e.g., neural network assisted, rule, cognitive or flow-based methods, etc.). The matching alarms may also be marked in the network elements so that it is known that they have already been addressed. If several high-priority alarms can be connected to a certain alarm, multiple markings may also be used. The system may utilize an iterative process until there are no high-priority alarms remaining. The remaining low-priority alarms may then be deleted from the system since they do not belong to any important problem. Alternatively, the remaining alarms may be addressed by existing conventional bottom-up algorithms.

Additionally, there may be unmarked, high-priority but low-level problems remaining at this stage. Such alarms are not visible on the network level as high-priority problems. The reason may be that they have not yet affected business critical services, but may still be considered important because such alarms are likely to cause high-level alarms later. The system 10 may proactively handle such alarms in the same way as high-level alarms whereby the PBA functionality 14 polls for each remaining unmarked high-priority alarm.

After the system 10 determines that all poll processes have been completed, alarm events may be deleted from the network elements databases. In an alternate embodiment of the present invention, low priority alarms that have not been polled may be processed according to conventional processes utilizing a bottom-up approach. These remaining low priority alarms may be sent for correlation to the central management system 12, potentially utilizing existing distributed correlation solutions.

The PBA functionality 14 may be initiated if a top-level performance metric, such as the availability, retainability, or accessibility falls below a specified threshold. Important events that are on the top-level are called high-priority top level (HP-TL) alarms. There are several existing methods capable of such top-level monitoring. In one embodiment, the PBA functionality 14 may be initiated by a passive monitoring system that monitors protocol events or network node events. In another embodiment, the PBA functionality may be initiated by active testing methods that periodically check the performance of services in the network. The PBA functionality may also be initiated if a low-level but high-priority (HP-LL) alarm has not been handled within a specified time period. HP-LL alarms are problems that are created by network elements, but have not affected any top-level node or function. Although these alarms are at a low-level, the HP-LL alarms are still high-priority and are preferably handled by the PBA functionality because they are likely to elevate HP-TL alarms with high-risk.

In the preferred embodiment of the present invention, in order for the PBA functionality 14 to operate efficiently, some attributes of the high priority alarm are examined. This is necessary for the efficient selection of the focus area to be discussed below. In one embodiment, the problem may be related to a streaming service and the problem attributes may include server address, client address, streamed media location, time-of-day, and access location of the client.

Figure 2:
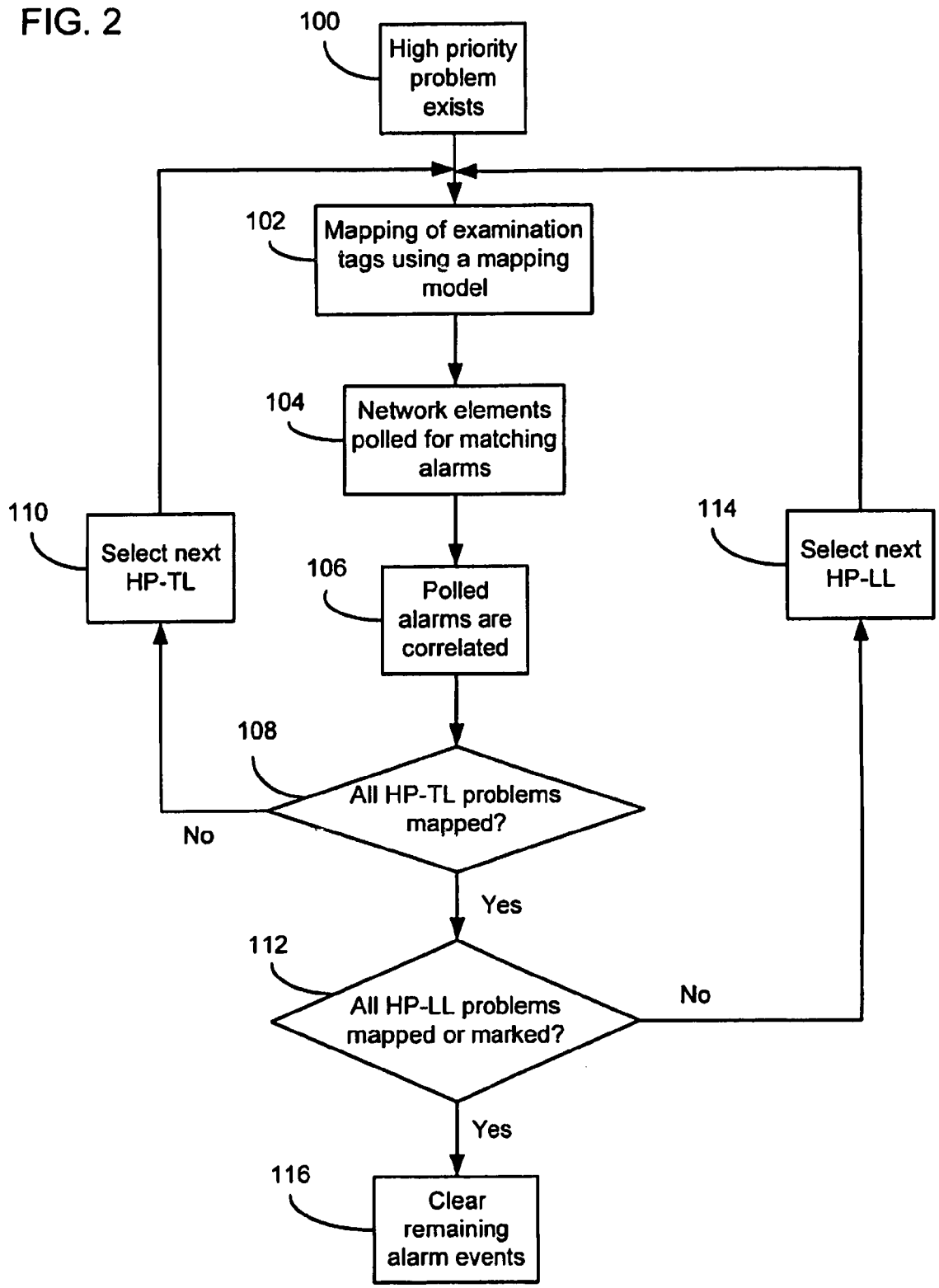
FIG. 2 is a flow chart illustrating the steps of a polling alarm method according to the teachings of the present invention.

FIG. 2 is a flow chart illustrating the steps of a polling alarm method according to the teachings of the present invention. With reference to FIGS. 1 and 2, the method will now be explained. The method begins in step 100 where a high-priority problem exists. The high-priority problem may be a detected HP-TL problem or a HP-LL problem which is unmarked for a specified time period. Parts of the network that are related to the serving of a monitored service are identified and marked with an examination tag. In step 102, the examination tags are mapped using a mapping model. Next, in step 104, the PBA functionality 14 polls the network elements 16 for matching alarms. In step 106, the polled alarms are correlated. The method then moves to step 108 where it is determined if all the HP-TL problems are mapped. If all of the HP-TL problems are not mapped, the method moves to step 110 where the central management system 12 selects the next HP-TL alarm. Next, the method returns to step 102.

However, in step 108, if it is determined that all the HP-TL problems are mapped, the method moves to step 112 where it is determined if all the HP-LL problems are mapped or marked. If it is determined that all the HP-LL problems are not mapped or marked, the method moves to step 114 where the central management system 12 selects the next HP-LL alarm. The method then moves back to step 102. However, in step 112, if it is determined that all the HP-LL problems are mapped or marked, the method moves to step 116 where the remaining alarm events are cleared from the network elements 16.

Figure 3:
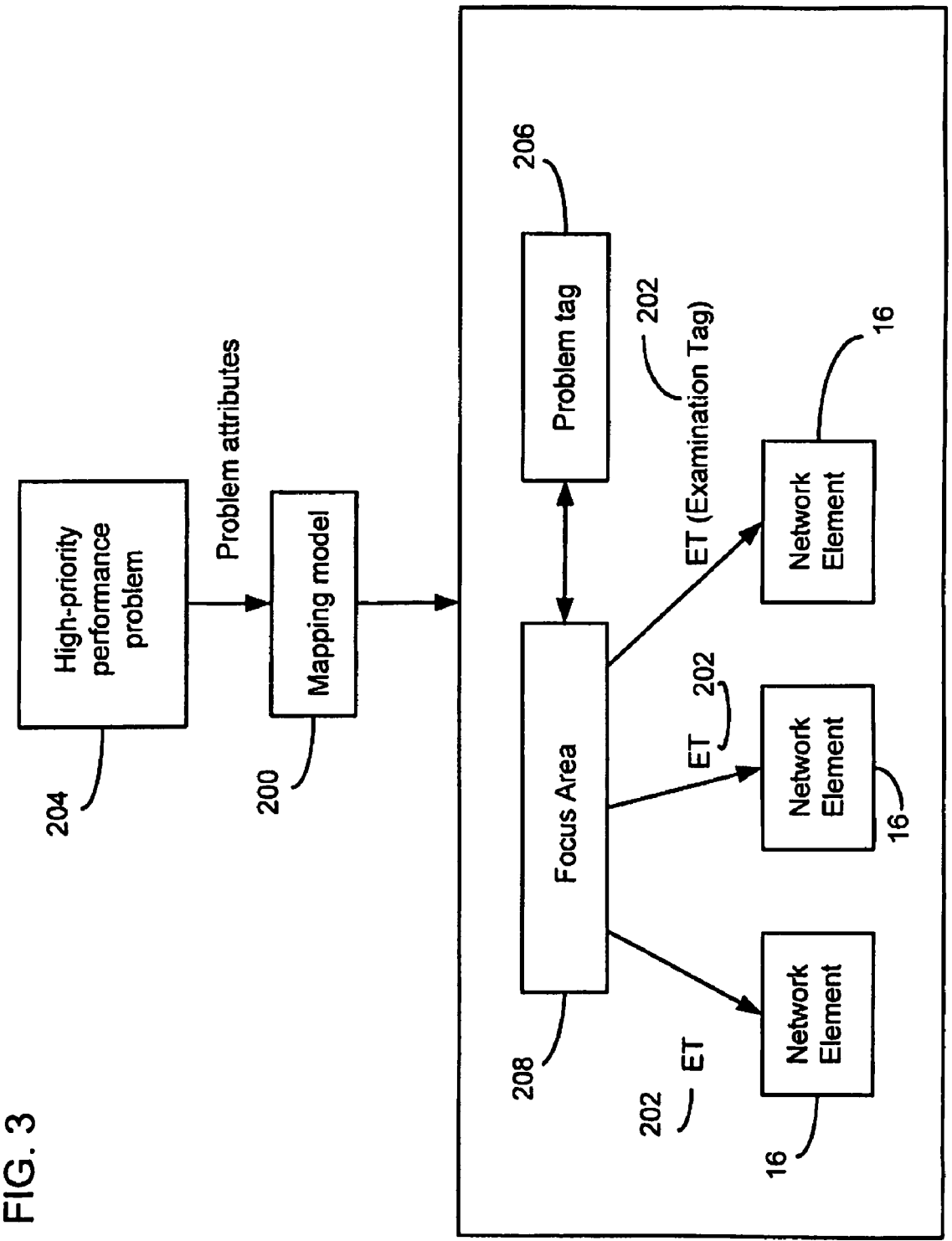
FIG. 3 is a simplified block diagram of the process of mapping examination tags using a mapping model.

In regards to step 102, the parts of the network that are related to the servicing of the monitored service are identified and marked with an examination tag. FIG. 3 is a simplified block diagram of the process of mapping examination tags using a mapping model of step 102. Step 102 requires a mapping algorithm, which is described by a mapping model 200. The examination tag 202 consists of information related to a high-priority problem 204 called a problem tag 206 and a poll filter (not shown) which describes and specifies the criteria for selecting which alarm is necessary for alarm correlation. All network parts marked with the same problem tag are identified as a focus area 208. The problem tag 206 describes the high priority serviced related alarm that triggers the top-down alarm polling method.

The focus area 208 is preferably as narrow as possible. To accomplish the scope of the focus area, the mapping model 200 is necessary whereby the problem attributes may be narrowed down for a specific focus area 208 (i.e., the number of network elements in the focus area). The mapping model 200 utilizes a mapping based on knowledge of the network topology. For example, if the service under investigation is streaming and the problem attribute defines an access network part where the problem was detected, the mapping model may include in the focus area the streaming server, the access nodes, as well as all network elements between the server and the access. However, the focus area 208 should not be smaller than the possible network elements that could be related to the service problem. Preferably, the focus area may be broader, but not narrower, in order to avoid skipping an alarm related to the problem. If the focus area is broader, more unrelated alarms may be polled than necessary, thus the elimination of the unrelated alarms is the task of the alarm correlator. The actual mapping algorithm depends on the network configuration and topology and is preferably customized for the specific network. For example, L1-L2-L3 paths, tunnels, SDH, MPLS configuration is preferably considered in developing the mapping algorithm.

Figure 4:
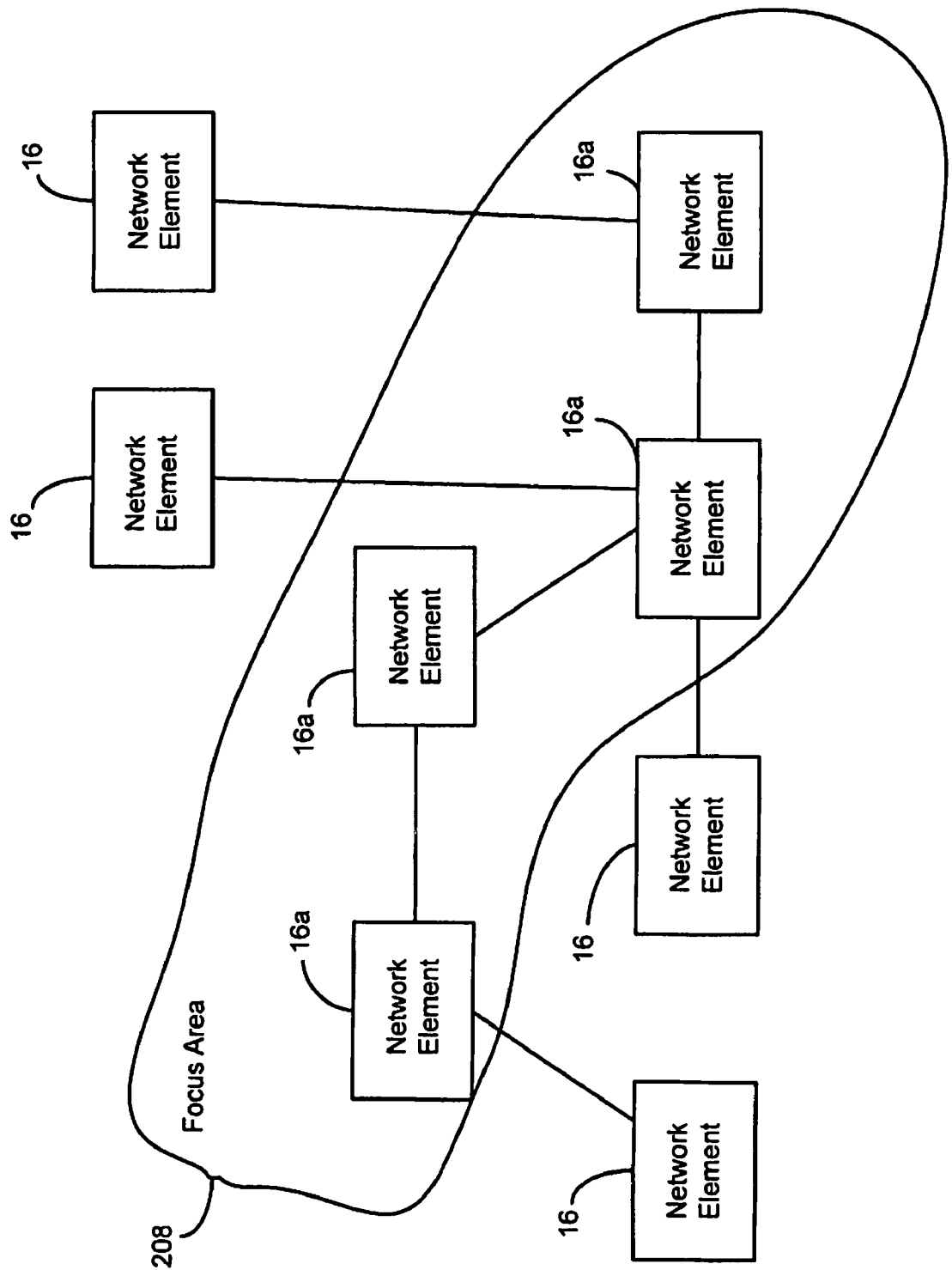
FIG. 4 is a simplified block diagram illustrating a plurality of network elements in the focus area.

FIG. 4 is a simplified block diagram illustrating a plurality of network elements 16a in the focus area 208. Besides finding a suitable focus area 208, the amount of polled alarms may be further reduced by the application of poll filters included in the examination tag 202. The poll filter describes the criteria for selecting an alarm which may be related for a particular service. Each network element may have different poll filters as defined by the mapping model. The poll filter's task is to exclude from possible polling those alarms that have no possible relation to the problem.

In one embodiment of the present invention, service related information and problem attributes may be used in the mapping model by the poll filters. For example, In the case of mobile streaming related alarm, correlation of all non-streaming bearer related alarms in UTRAN may be excluded from the streaming analysis by including such a limitation in the poll filter issued towards the UTRAN network elements.

Figure 5:
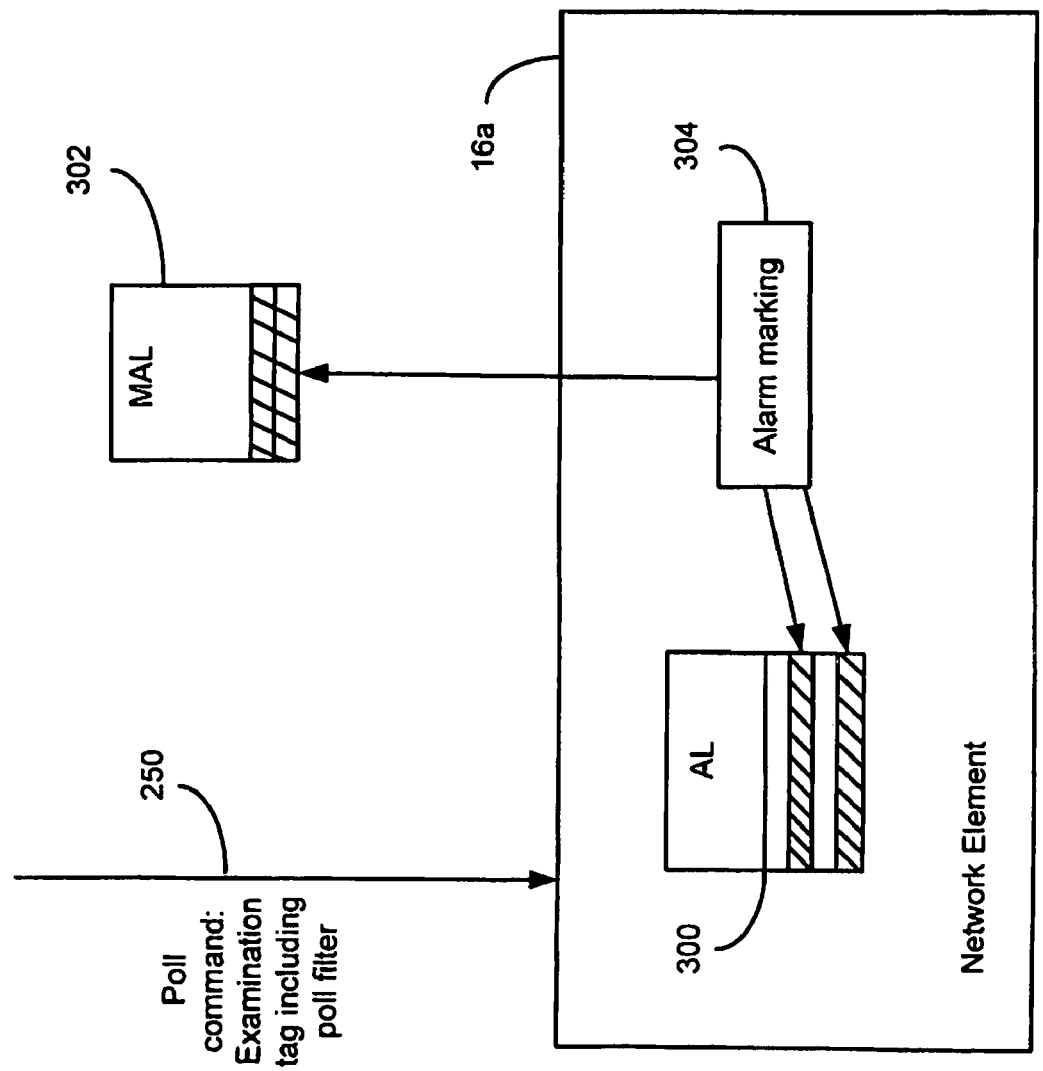
FIG. 5 is a simplified block diagram illustrating the polling process of the network element.

FIG. 5 is a simplified block diagram illustrating the polling process of the network element. In regards to step 104, the polling of high and low priority alarms is initiated within a specified focus area 208. Each network element 16a in the focus area that has an examination tag 202 is polled with a poll command 250, and the respective poll filter is sent to each network element. The network element locally applies the filter against a network element's active Alarm List (AL) 300, and then collects and responds with a matching alarm list (MAL) 302. In this step 104, local processing of alarms is also possible to reduce the amount of alarms sent back (e.g., elimination of duplicate alarms). At the end of this step 104, the network elements mark all alarms with an alarm marking 304 that have been polled and leave un-polled alarms unmarked.

Figure 6:
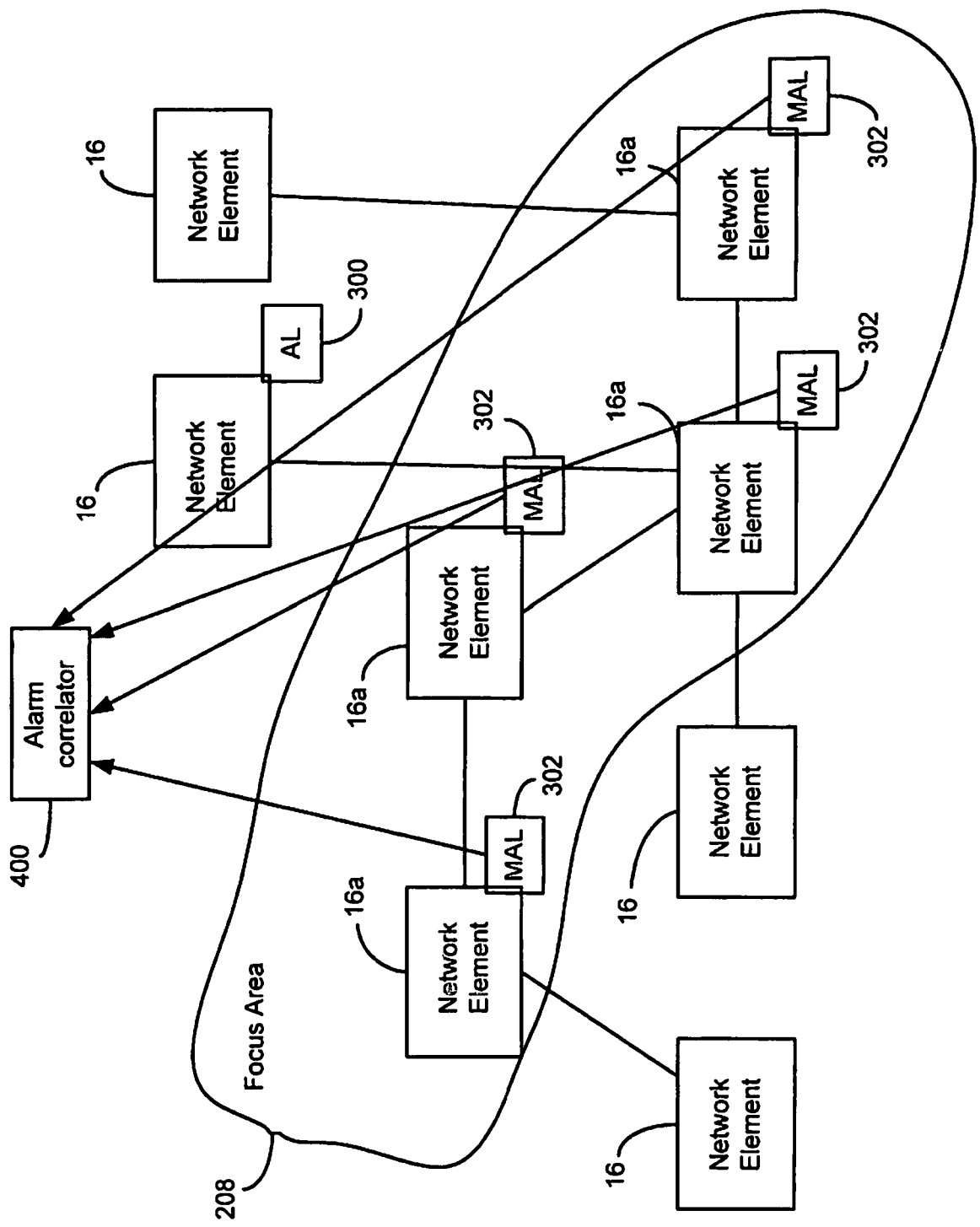
FIG. 6 is a simplified block diagram illustrating the correlation by an alarm correlator of the network elements in the focus area.

In regards to step 106, the polled alarms are collected and processed. FIG. 6 is a simplified block diagram illustrating the correlation by an alarm correlator 400 of the network elements 16a in the focus area 208. There are various existing methods known in the art that can be applied to correlate the alarms and pinpoint "root cause" alarms. Since the amount of alarms is greatly reduced from step 104, in other embodiments, highly complex correlation methods are also feasible from a processing scalability point of view.

Steps 102, 104, and 106 are iterated for each top-level problem. This ensures that all top-level problems are treated. In some cases, some low-level alarms may cause several top-level problems. In these cases, the low-level alarms may be marked and polled more than once. This is necessary in order to explore all possible causes of a top-level problem. The multiple transmissions of such alarms may be optimized using some optimization techniques. Such optimization techniques may be easily designed by one skilled in the art.

Steps 102, 104, and 106 are then iterated for all yet unmarked HP-LL problems. Marked HP-LL problems do not need to be processed because they have previously been addressed as is indicated by the fact that they are marked already. After all HP-TL alarms have been analyzed, all non-top-level but high-risk HP-LL alarms are also handled. In some situations, HP-LL alarms are actual high-severity network element alarms, such as link failures. It is likely that even if no top-level service has been affected by this link failure, it is advisable to propagate the problem to the top level and issue a poll process in order to investigate this high-risk situation.

In regards to step 116, a clear alarms command may be issued to the network elements. All alarms are then released or deleted from the network element storage areas. In one embodiment of the present invention, an additional step may be added whereby all remaining unhandled and unmarked events are handled using conventional bottom-up algorithms.

The present invention provides many advantages over existing fault management systems. The present invention focuses on finding root-causes of business critical problems that typically appear on the network-level, which is in contrast to existing solutions which attempt to aggregate alarms locating and propagate the alarms upwards. Thus, the present invention provides a more efficient and fast solution of business critical problems. In addition, the present invention may be used in combination with a variety of existing alarm optimization methods including alarm correlation and distributed management solutions.

As will be recognized by those skilled in the art, the innovative concepts described in the present application can be modified and varied over a wide range of applications.

Accordingly, the scope of patented subject matter should not be limited to any of the specific exemplary teachings discussed above, but is instead defined by the following claims.

The invention claimed is:

1. A method of handling poll-based alarms, the method comprising the steps of:
    detecting a high-priority problem in a network;
    mapping of a plurality of network elements in the network related to the high-priority problem;
    polling the mapped plurality of network elements for alarms;
    correlating polled alarms in the plurality of network elements; and
    processing correlated polled alarms.

2. The method according to claim 1 wherein the step of mapping of a plurality of network elements includes:
    identifying network elements that are related to a service associated with the detected problem; and
    marking the identified network elements with an examination tag.

3. The method according to claim 2 wherein the examination tag includes a problem tag describing a problem at each identified network element and a poll filter describing the criteria for selecting an alarm which may be related to the service associated with the detected problem.

4. The method according to claim 3 wherein the step of mapping of a plurality of network elements includes grouping at least one identified network element into a focus area, each network element in the focus group having the same problem tag.

5. The method according to claim 4 wherein the step of polling includes polling only network elements in the focus group.

6. The method according to claim 5 wherein the step of polling includes sending the poll filter to each marked element and each marked element applies the poll filter against an alarm list describing alarms of the marked network element.

7. The method according to claim 1 further comprising the step of:
    upon determining that an additional high-priority problem exists, iteratively conducting the steps of:
    mapping of a plurality of network elements in the network related to the additional high-priority problem;
    polling the mapped plurality of network elements for alarms;
    correlating polled alarms in the plurality of network elements; and
    processing correlated polled alarms.

8. The method according to claim 1 wherein the high-priority problem occurs at a low level in the network.

9. The method according to claim 8 wherein the step of detecting a high-priority low level problem occurs when the problem is not handled within a specified time period.

10. The method according to claim 1 wherein the high-priority problem occurs at a top level in the network.

11. The method according to claim 10 wherein the step of detecting a high-priority top level problem occurs when a performance metrics of the network falls below a specified threshold.

12. The method according to claim 1 further comprising, after the step of processing correlated polled alarms, the step of clearing remaining alarms which are not polled or marked.

13. A system for handling poll-based alarms, the system comprising:
    means for detecting a high-priority problem in a network;
    means for mapping of a plurality of network elements in the network related to the high-priority problem;
    a polling functionality for polling the mapped plurality of network elements for alarms;
    means for correlating polled alarms in the plurality of network elements; and
    means for processing correlated polled alarms.

14. The system according to claim 13 wherein the means for mapping of a plurality of network elements includes:
    means for identifying network elements that are related to a service associated with the detected problem; and
    means for marking the identified network elements with an examination tag.

15. The system according to claim 14 wherein the examination tag includes a problem tag describing a problem at each identified network element and a poll filter describing the criteria for selecting an alarm which may be related to the service associated with the detected problem.

16. The system according to claim 15 wherein the means for mapping of a plurality of network elements includes grouping at least one identified network element into a focus area, each network element in the focus group having the same problem tag.

17. The system according to claim 16 wherein the polling functionality polls only network elements in the focus group.

18. The system according to claim 17 wherein the polling functionality sends the poll filter to each marked network element and each marked element applies the poll filter against an alarm list describing alarms of the marked network element.

19. The system according to claim 13 wherein the high-priority problem occurs at a low level in the network.

20. The system according to claim 19 wherein the means for detecting a high-priority low level problem occurs when the problem is not handled within a specified time period.

21. The system according to claim 13 wherein the high-priority problem occurs at a top level in the network.

22. The system according to claim 21 wherein the means for detecting a high-priority top level problem occurs when a performance metrics of the network falls below a specified threshold.

23. The system according to claim 13 wherein all remaining alarms which are not polled or marked are cleared.

24. A node for handling poll-based alarms, the node comprising:
    In response to a detection of a high-level problem in a network, means for mapping of a plurality of network elements in the network related to the high-priority problem;
    a polling functionality for polling the mapped plurality of network elements for alarms;
    means for correlating polled alarms in the plurality of network elements; and
    means for processing correlated polled alarms.

25. The node according to claim 24 wherein the means for mapping of a plurality of network elements includes:
    means for identifying network elements that are related to a service associated with the detected problem; and
    means for marking the identified network elements with an examination tag.

26. The node according to claim 25 wherein the examination tag includes a problem tag describing a problem at each identified network element and a poll filter describing the criteria for an alarm which may be related to the service associated with the detected problem.

27. The node according to claim 26 wherein the means for mapping of a plurality of network elements includes grouping at least one identified network element into a focus area, each network element in the focus group having the same problem tag.

28. The node according to claim 27 wherein the polling functionality polls only network elements in the focus group.

29. The node according to claim 28 wherein the polling functionality sends the poll filter to each marked network element and each marked element applies the poll filter against an alarm list describing alarms of the marked network element.

30. A method of handling poll-based alarms, the method comprising the steps of:
- detecting a high-priority problem in a network;
- mapping of a plurality of network elements in the network related to the high-priority problem, where the mapping step includes:
  - identifying network elements that are related to a service associated with the detected problem;
  - marking the identified network elements with an examination tag, where the examination tag includes a problem tag which describes a problem at each identified network element and a poll filter which describes criteria for selecting an alarm and excludes from possible polling those alarms that have no possible relation to the high-priority problem; and
  - grouping at least one identified network element into a focus group, each network element in the focus group having the same problem tag;
- polling the mapped plurality of network elements for alarms, where the step of polling includes polling only network elements in the focus group and sending each of the polled network elements a poll command including the poll filter, where each of the polled network elements locally apply the poll filter against an active alarm list and then collect and respond with a matching alarm list;
- receiving the matching alarm lists from the polled network elements;
- correlating alarms in the matching alarm lists; and
- processing the correlated alarms.

31. A central management system, comprising:
a Poll-Based Alarm functionality configured to:
- detect a high-priority problem in a network;
- map of a plurality of network elements in the network related to the high-priority problem, where the map operation includes:
  - identify network elements that are related to a service associated with the detected problem;
  - mark the identified network elements with an examination tag, where the examination tag includes a problem tag which describes a problem at each identified network element and a poll filter which describes criteria for selecting an alarm and excludes from possible polling those alarms that have no possible relation to the high-priority problem; and
  - group at least one identified network element into a focus group, each network element in the focus group having the same problem tag;
- poll the mapped plurality of network elements for alarms, where the step of polling includes polling only network elements in the focus group and sending each of the polled network elements a poll command including the poll filter, where each of the polled network elements locally apply the poll filter against an active alarm list and then collect and respond with a matching alarm list;
- receive the matching alarm lists from the polled network elements;
- correlate alarms in the matching alarm lists; and
- process the correlated alarms.

* * * * *

UNITED STATES PATENT AND TRADEMARK OFFICE
CERTIFICATE OF CORRECTION

| | | |
|---|---|---|
| PATENT NO. | : 8,284,044 B2 | Page 1 of 1 |
| APPLICATION NO. | : 12/343094 | |
| DATED | : October 9, 2012 | |
| INVENTOR(S) | : Veres et al. | |

It is certified that error appears in the above-identified patent and that said Letters Patent is hereby corrected as shown below:

In Column 8, Line 46, in Claim 24, delete "In response" and insert -- in response --, therefor.

Signed and Sealed this
Fourth Day of December, 2012

David J. Kappos
*Director of the United States Patent and Trademark Office*